Nov. 3, 1959     S. C. BRANSON     2,911,027
ANTI-SKID ICE TIRE CHAIN
Filed March 14, 1958     2 Sheets-Sheet 1
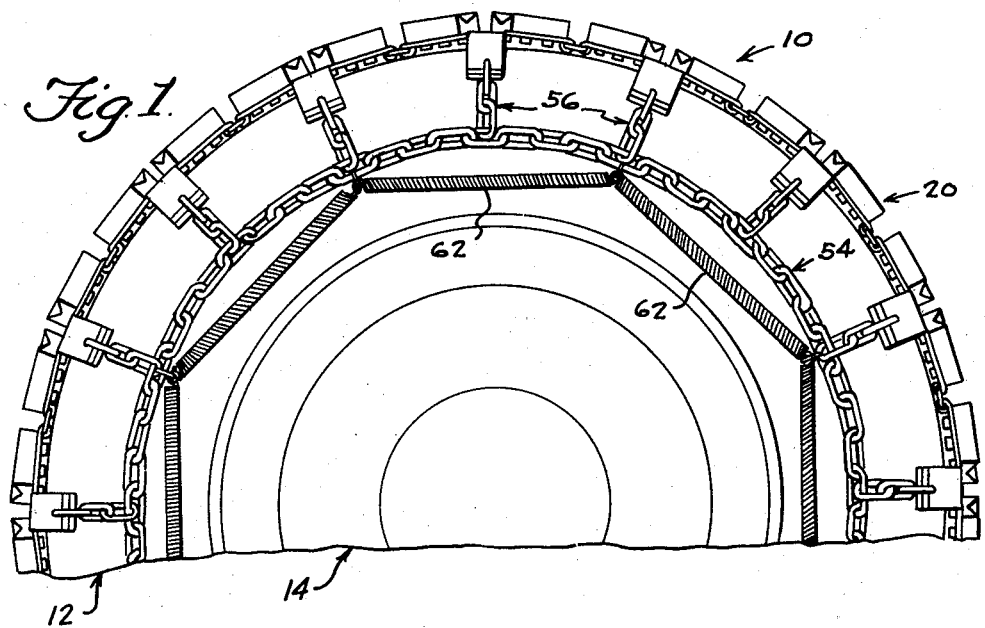
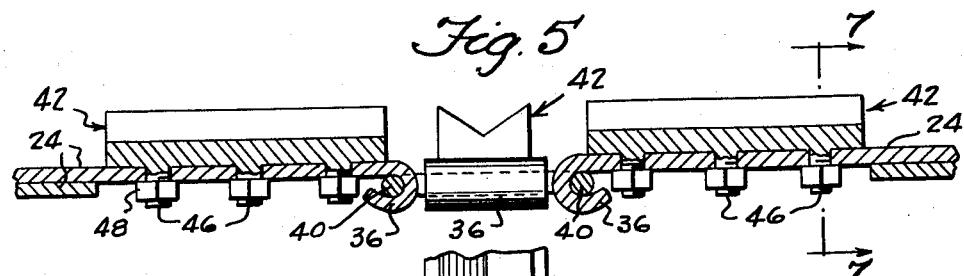
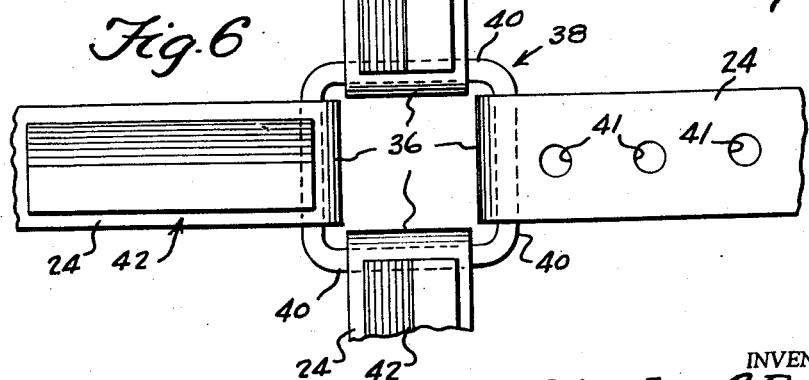
INVENTOR.
*Stanley C. Branson*
BY
*McMorrow, Berman & Davidson*
ATTORNEYS Nov. 3, 1959 S. C. BRANSON 2,911,027
ANTI-SKID ICE TIRE CHAIN
Filed March 14, 1958 2 Sheets-Sheet 2
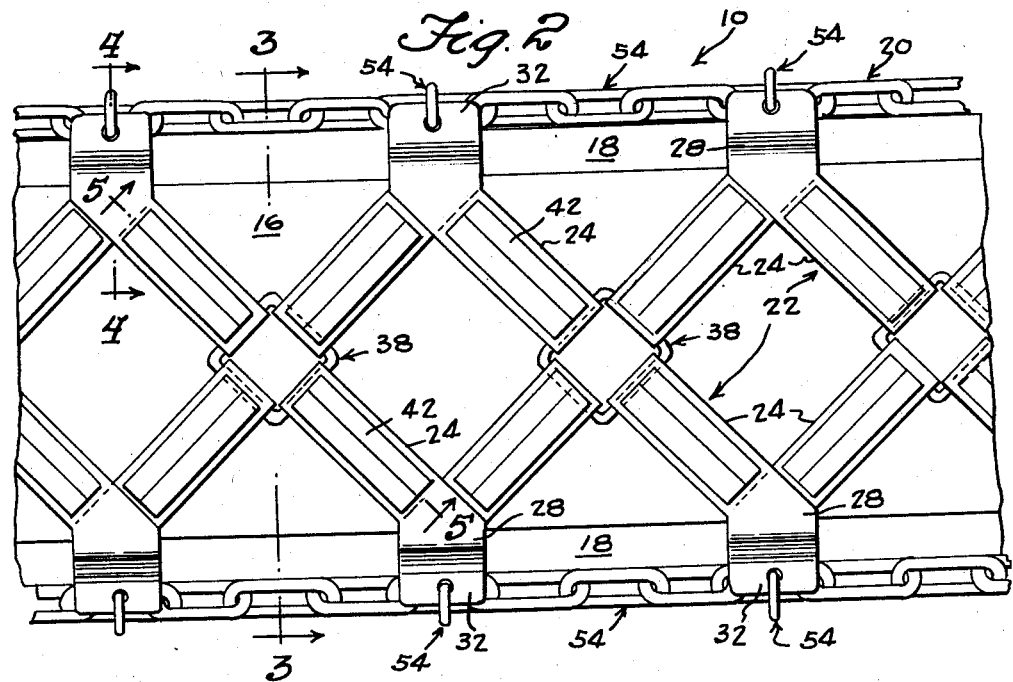
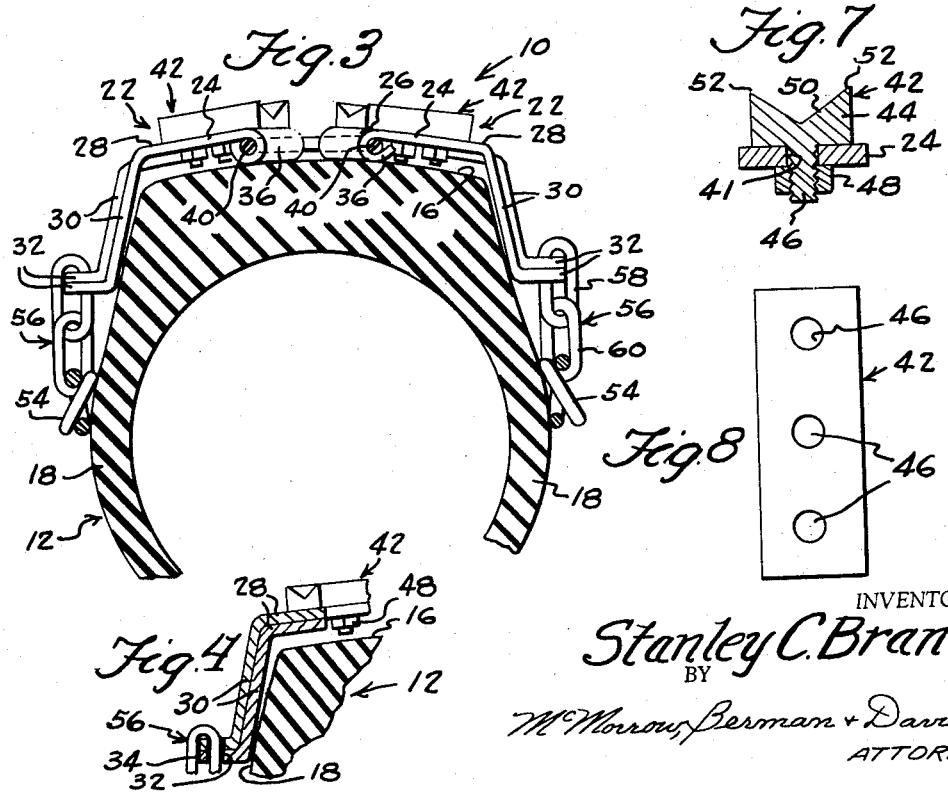
INVENTOR.
Stanley C. Branson
BY
McMorrow, Berman + Davidson
ATTORNEYS

United States Patent Office 2,911,027
Patented Nov. 3, 1959

2,911,027

ANTI-SKID ICE TIRE CHAIN

Stanley C. Branson, Anchorage, Alaska

Application March 14, 1958, Serial No. 721,409

11 Claims. (Cl. 152—239)

This invention relates to improvements in anti-skid tire chains for vehicle wheels, and more particularly to an improved anti-skid tire chain designed especially for use on ice-covered pavements and roads.

The primary object of the invention is to provide a more efficient and longer life tire chain of this kind which presents to an ice-covered surface at any one time a group of directly and flexibly connected anti-skid members, adjacent groups of such members being directly and flexibly connected to each other around the circumference of the chain, so that bumping effects, as a vehicle moves over an ice-covered surface, are eliminated, and rolling distortions of a tire accommodated.

Another object of the invention is to provide a tire chain of the character indicated above wherein each of the above mentioned groups is composed of two V-shaped members each composed of two divergent arms extending to the centerline of the tread of a tire, the inner or free ends of related divergent arms of the members being flexibly connected together, and the apex portions of the members being flexibly and loosely connected to flexible side chains for engaging opposite sides of a tire, the apex portions of the members having thereon tire side engaging portions which prevent shifting of the members crosswise of a tire, the tire side engaging portions serving as anchors for flexible means connecting the members to tire side chains, and as stone guards for the sides of the tire.

A further object of the invention is to provide a tire chain of the character indicated above wherein sharpened road-surface engaging cleats are removably and replaceably mounted on the divergent arms of the V-shaped members, so that worn cleats can be removed, sharpened, and replaced on the arms or replaced with new cleats.

Other important objects and advantageous features of the invention will be apparent from the following description and the accompanying drawings, wherein, for purposes of illustration only, a specific form of the invention is set forth in detail.

In the drawings:

Figure 1 is a fragmentary side elevation of a vehcile wheel and tire, showing an anti-skid ice tire chain of the invention installed on the tire;

Figure 2 is an enlarged fragmentary plan view of said tire chain;

Figure 3 is a fragmentary transverse section taken on the line 3—3 of Figure 2;

Figure 4 is a fragmentary transverse section taken on the line 4—4 of Figure 2;

Figure 5 is an enlarged fragmentary transverse section taken on the line 5—5 of Figure 2;

Figure 6 is an enlarged fragmentary plan view similar to Figure 2, showing an ice cleat removed;

Figure 7 is a transverse section taken on the line 7—7 of Figure 5; and

Figure 8 is a bottom plan view of an ice cleat.

Referring in detail to the drawings, wherein like numerals designate like parts throughout the several views, the illustrated anti-skid ice chain, generally designated 10, is shown installed on a tire 12, mounted on a vehicle wheel 14, the tire 12 having a tread 16 and sides or side walls 18.

The chain 10 comprises a tire tread engaging ring 20 composed of V-shaped cleat holders 22, each having two divergent arms 24 having free laterally inward ends 26, and laterally outward ends which are joined together by apex portions 28. The apex portions 28 terminate at their laterally outward ends in tire side wall engaging flanges 30, which are disposed at angles of about ninety-five degrees to the apex portions 28 and the general plane of the holders 22. On their radially inward ends the flanges 30 have laterally outwardly projecting ears 32 which have single holes 34 therein.

The arms 24, the apex portions 28, the flanges 30, and the ears 32 are preferably of flat bar stock having slight flexibility. On the inward ends 26 of the arms 24 are formed open barrels 36 which extend crosswise of the arms 24 and are located at the radially inward sides of the arms 24 and engage the tire tread 16, as shown in Figure 3. Cleat holders 22 are arranged in opposed and adjacent pairs crosswise and lengthwise of the tire tread 16, and rectangular connectors 38 have side bars 40 journaled in barrels 36 of related arms 24, and the side bars 40 are slightly larger than the widths of the arms 24, so as to enable slight working of the arms therealong while producing hinged connections between the arms having a minimum of lost motion. As shown in Figures 2 and 6, arms 24 of circumferentially adjacent cleat holders 22 connected by connectors 38 are in longitudinal alignment with each other, so that the holders 22 define diamond forms extending continuously around the ring 20 without interruption and without spaces therebetween, so that bumping noises and uneven action of the chain in service are illustrated. The diagonal arrangements of connected arms 24 of adjacent cleat holders 22 provide diagonal ice-engaging anti-skid forms which resist skidding in all directions.

The cleat holder arms 24 have therein longitudinally spaced holes 41, and removable ice cleats 42 comprise elongated bars 44 of substantial and rectangular cross section, of substantially the length of the arms 24 and slightly narrower than the arms 24 which are disposed along the outer sides of the arms 24, and have threaded studs 46 on their inward sides which engage removably in the holes 41, and have nuts 48 thereon engaged with the inward sides of the arms 24, as shown in Figures 3 and 5. The studs 46 do not project as far inwardly as the barrels 36, so that any engagement of the studs with the tire tread 16 is only incidental. The outer sides of the ice cleat bars 44, as shown in Figures 5 and 7 have therein longitudinal V-shaped channels 50 whose side walls intersect the side edges of the bars 44 so as to define sharp edges 52 at the side edges of the ice cleats, which effectively dig into ice on a road surface and prevent skidding thereon. When dulled in service, the edges 52 can be resharpened, or worn cleats 42 can be removed and replaced with new cleats, by removing and replacing the nuts 48.

The flanges 30 and the ears 32 of adjacent cleat holders 22 are overlapped, as shown in Figure 3, with the ear holes 34 registered, and the overlapped ears 32 are connected to appropriate links of conventional side chains 54, engaged with the tire side walls 18 inwardly of the tire tread 16, by short chains 56 preferably only two outer and inner links 58 and 60, respectively, the outer links 58 being engaged through the holes 34 of the two overlapped ears 32, as shown in Figure 2. This arrangement provides for a limited and desired amount of relative movements between the cleat holders 22 and the side chains 54, while providing for relatively unshifting engagement of the flanges 30 relative to the tire side walls. Inward pull on the ears 32 exerted by the side chains 54 serves to press the flanges 30 more firmly into engagement with the tire side walls 18, the flanges 30 being slightly flexible relative to the cleat holders 22 and angled relative thereto, for this purpose.

The overlapped flanges 30 and ears 32, disposed as they are at relatively small intervals around the tire side wall 18, serve as ice and rock guards for the tire side walls, and eliminate or minimize ice and rock damage to the side walls 18. Suitable chain tighteners 62 are associated with the side chains 54, and are preferably connected to and stretched between the side chains at alternate points of connection of the short chains 56 with the side chains 54, as shown in Figure 1.

Although I have shown and described herein a specific embodiment of my invention, it is to be understood that any change or changes in the forms of and in the relative arrangements of components thereof are contemplated as being within the scope of the invention as defined by the claims appended hereto.

What is claimed is:

1. An anti-skid ice chain comprising a tire tread engaging ring comprising V-shaped cleat holders each having a pair of divergent rigid and rigidly connected arms having free ends having hinge barrels thereon, apex portions rigidly connecting the other ends of said arms, the cleat holders being arranged in opposed pairs crosswise of the ring, pairs of cleat holders being circumferentially adjacent to each other, and rectangular connector rings having side bars journaled in the hinge barrels of related arms of opposed and circumferentially adjacent cleat holders.

2. An anti-skid chain according to claim 1, wherein said related arms of circumferentially adjacent cleat holders being in linear alignment with each other, and opposed pairs of cleat holders defining diamond forms.

3. An anti-skid chain according to claim 1, wherein said apex portions terminate in radially inwardly extending tire side wall engaging flanges ending in lateral ears, the flanges and ears of circumferentially adjacent cleat holders being overlapped, the overlapped ears having registered holes therein, and short radial chains having outer links engaged through the registered holes.

4. An anti-skid chain according to claim 1, wherein said apex portions terminate in radially inwardly extending tire side wall engaging flanges ending in lateral ears, the flanges and ears of circumferentially adjacent cleat holders being overlapped, the overlapped ears having registered holes therein, and short radial chains having outer links engaged through the registered holes, tire side walls engaging side chains, said short chains having inner links connected to the side chains.

5. An anti-skid chain according to claim 1, wherein said apex portions terminate in radially inwardly extending tire side wall engaging flanges ending in lateral ears, the flanges and ears of circumferentially adjacent cleat holders being overlapped, the overlapped ears having registered holes therein, and short radial chains having outer links engaged through the registered holes, tire side walls engaging side chains, said short chains having inner links connected to the side chains, and chain tighteners stretched between and connected to points to the side chains to which the inner links of the short chains are connected.

6. An anti-skid chain according to claim 1, wherein said apex portions terminate in radially inwardly extending tire side wall engaging flanges ending in lateral ears, the flanges and ears of circumferentially adjacent cleat holders being overlapped, the overlapped ears having registered holes therein, and short radial chains having outer links engaged through the registered holes, tire side walls engaging side chains, said short chains having inner links connected to the side chains, said flanges being disposed at laterally outward angles relative to said arms and being resiliently flexible relative to the said arms.

7. An anti-skid chain according to claim 1, wherein said cleat holder arms are elongated flat bars having outward and inward sides.

8. An anti-skid chain according to claim 1, wherein said cleat holder arms are elongated flat bars having outward and inward sides, said arm bars having longitudinally spaced holes therein, and removable ice cleats extending along and engaged with the outward sides of the arm bars, said cleats having threaded studs engaged in said holes, and nuts on the studs engaged with the inward sides of the arm bars.

9. An anti-skid chain according to claim 1, wherein said cleat holder arms are elongated flat bars having outward and inward sides, said arm bars having longitudinally spaced holes therein, and removable ice cleats extending along and engaged with the outward sides of the arm bars, said cleats having threaded studs engaged in said holes, and nuts on the studs engaged with the inward sides of the arm bars, said ice cleats having outward sides having longitudinal grooves therein, said grooves having sides intersecting side edges of the cleats so as to define sharp ice penetrating edges along the cleats.

10. An anti-skid ice chain comprising a tire tread engaging ring composed of a plurality of circumferentially adjacent V-shaped cleat holders arranged in opposed pairs, said cleat holders comprising divergent rigid and rigidly connected arms having tire tread engaging inward sides and outward sides, ice cleats secured on and along the outward sides of the said arms, apex portions rigidly connecting the convergent ends of said arms and hinge barrels on the divergent free ends of said arms, arms of opposed and circumferentially adjacent cleat holders being aligned, and rectangular rings having opposite sides journaled through hinge barrels of aligned arms, and means on the apex portions for connecting tire engaging chains thereto.

11. An anti-skid ice chain comprising a tire tread engaging ring composed of a plurality of circumferentially adjacent V-shaped cleat holders arranged in opposed pairs, said cleat holders comprising divergent rigid and rigidly connected arms having tire tread engaging inward sides and outward sides, ice cleats secured on and along the outward sides of the said arms, apex portions rigidly connecting the convergent ends of said arms and hinge barrels on the divergent free ends of said arms, arms of opposed and circumferentially adjacent cleat holders being aligned, and rectangular rings having opposite sides journaled through hinge barrels of aligned arms, and means on the apex portions for connecting tire engaging chains thereto, said ice cleats being elongated longitudinally of the arms, said ice cleats having outward sides having longitudinal grooves therein defining ice-engaging edges along opposite sides of the cleats.

References Cited in the file of this patent

UNITED STATES PATENTS

| | | |
|---|---|---|
| 1,193,392 | Hughes | Aug. 1, 1916 |
| 2,270,692 | Stanton | Jan. 20, 1942 |
| 2,437,040 | Prevost et al. | Mar. 2, 1948 |